United States Patent
Hirose et al.

(10) Patent No.: US 8,508,790 B2
(45) Date of Patent: Aug. 13, 2013

(54) IMAGE WRITING SYSTEM, WRITING APPARATUS, DISPLAY MEDIUM, IMAGE WRITING METHOD, COMPUTER READABLE MEDIUM FOR IMAGE WRITING AND COMPUTER DATA SIGNAL FOR IMAGE WRITING

(75) Inventors: Yoshitsugu Hirose, Kanagawa (JP); Hiroyuki Hotta, Kanagawa (JP); Minoru Koshimizu, Kanagawa (JP); Naoki Hayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1313 days.

(21) Appl. No.: 11/806,608

(22) Filed: Jun. 1, 2007

(65) Prior Publication Data

US 2008/0088882 A1    Apr. 17, 2008

(30) Foreign Application Priority Data

Oct. 16, 2006 (JP) ................ 2006-281032

(51) Int. Cl.
*G06K 15/22* (2006.01)
(52) U.S. Cl.
USPC .......................................... 358/1.3; 358/296
(58) Field of Classification Search
None
See application file for complete search history.

(56) References Cited

U.S. PATENT DOCUMENTS

| 2004/0021902 | A1* | 2/2004 | Ogiwara et al. ............. 358/1.15 |
| 2004/0160409 | A1  | 8/2004 | Kojima et al. |
| 2004/0189614 | A1  | 9/2004 | Nagatsuka et al. |
| 2005/0207677 | A1* | 9/2005 | Hotta et al. .................. 382/305 |
| 2005/0207727 | A1* | 9/2005 | Hirose et al. .................. 386/46 |
| 2005/0209980 | A1* | 9/2005 | Ishii et al. .................. 705/406 |
| 2005/0280627 | A1* | 12/2005 | Koshimizu et al. .......... 345/156 |
| 2005/0283472 | A1* | 12/2005 | Hayashi et al. .................. 707/4 |
| 2006/0001626 | A1  | 1/2006 | Saito et al. |
| 2007/0164927 | A1* | 7/2007 | Shoya et al. .................. 345/30 |
| 2007/0171462 | A1* | 7/2007 | Shoya et al. ................ 358/1.15 |
| 2007/0174918 | A1* | 7/2007 | Hirose et al. ................ 726/26 |
| 2007/0176850 | A1* | 8/2007 | Hirose et al. .................. 345/30 |
| 2007/0176937 | A1* | 8/2007 | Koshimizu et al. .......... 345/530 |

(Continued)

FOREIGN PATENT DOCUMENTS

JP   A 2002-203213   7/2002
JP   A 2004-251972   9/2004

(Continued)

OTHER PUBLICATIONS

Jan. 31, 2012 Office Action issued in Japanese patent application No. 2006-281032 (with translation).

*Primary Examiner* — Benjamin O Dulaney
(74) *Attorney, Agent, or Firm* — Oliff & Berridge, PLC (57) ABSTRACT

An image writing system includes: a display medium displaying an image rewritably recorded according to an external force and holding the image after the external force is removed, the display medium including a memory externally readably storing capability information on a capability of displaying an image on the display medium; and a writing apparatus applying the external force to the display medium so as to write the image into the display medium, the writing apparatus including: a reading section reading the capability information from the memory; a display-capability presenting section presenting information including the capability information, a list of images to be written, and display attributes of the respective images; an image-selection accepting section accepting a selection of an image to be written into the display medium; and a writing section applying the external force to the display medium so as to write the selected image into the display medium.

13 Claims, 5 Drawing Sheets

(56) References Cited

U.S. PATENT DOCUMENTS

| | | | |
|---|---|---|---|
| 2007/0206922 A1* | 9/2007 | Koshimizu et al. | 386/95 |
| 2007/0208785 A1* | 9/2007 | Hayashi et al. | 707/203 |
| 2008/0080004 A1* | 4/2008 | Hirose et al. | 358/1.17 |

FOREIGN PATENT DOCUMENTS

| | | |
|---|---|---|
| JP | A 2005-221723 | 8/2005 |
| JP | A 2005-266191 | 9/2005 |
| JP | A 2005-352461 | 12/2005 |

* cited by examiner

| MEDIUM ID | CAPABILITY INFORMATION (DISPLAY-AREA SIZE, RESOLUTION, COLOR/MONOCHROMATIC, ...) |

FIG. 3

| MEDIUM ID | CONTENT ID |
|-----------|------------|
| ⋮ | ⋮ |

FIG. 4

FIG. 5 ical Field
The present invention relates to an image writing system, a
IMAGE WRITING SYSTEM, WRITING APPARATUS, DISPLAY MEDIUM, IMAGE WRITING METHOD, COMPUTER READABLE MEDIUM FOR IMAGE WRITING AND COMPUTER DATA SIGNAL FOR IMAGE WRITING

CROSS-REFERENCE TO RELATED APPLICATION

This application is based on and claims priority under 35 USC §119 from Japanese Patent Application No. 2006-281032 filed Oct. 16, 2006.

BACKGROUND (i) Technical Field

The present invention relates to an image writing system, a writing apparatus, a display medium, an image writing method, a computer readable medium for image writing and a computer data signal for image writing.

(ii) Related Art

The printing matter, in general, is to present a fixed image by externally providing a coloring material, such as ink or toner, or a developing material onto a medium, represented by a paper. As a medium alternative to such a medium presenting a fixed image, research and development has been made on a display medium capable of: rewritably recording an image in accordance with an external force for writing; and maintaining the recorded image even after the removal of the external force.

There is known a display medium, called an electronic paper, capable of rewritably recording an image according to an external force for writing, which gives an electronic change to the medium, and capable of maintaining the image even after removing the external force.

Such a display medium contains a display material making up an image, at the inside of a display region serving as a region to maintain the image on display. By applying an external force for writing (electricity, magnetism, heat, chemical action such as a liquid having a PH or the like) to the display material, the display material is changed in state physically or chemically to form therein an image in accordance with the external force for writing. The image formed is maintained even after removing the external force. Furthermore, in case different external force for writing is applied, the former image changes into an image in accordance with the external force newly applied. There are frequent cases called an electronic paper because of the electronic device behavior in respect of rewriting the image on display without externally supplying a coloring material or a development agent, in addition to the paper-like nature in maintaining (storage) the display state the external force for writing is eliminated.

Incidentally, the display medium, called an electronic paper, usually has a memory provided integral with a display, to externally readably hold electronic information including medium-identifying code, wherein the electronic information can be used in control of image writing or so.

Meanwhile, the display medium usually does not have a display-change function singly on the medium itself because assumed for use as a display medium like a paper to be written and used repeatedly. Image writing is available by mounting the display medium on a writing apparatus on which the display medium as a subject of writing can be exchanged. The display medium, written with an image, is removed from the writing apparatus and used in viewing the written image.

For example, consider the case to write a text describing an event guide and a venue map of the event respectively to two types of display mediums, available at hand, that are similar in exterior shape but different in resolution. In this case, resolution is required higher for the display medium to write a map image than the displaying medium to write a text image. However, the user is not allowed to know which one is higher in resolution of those display mediums. Thus, there is a possibility to write, by mistake, a map image into the display medium lower in resolution.

The user can write the image again to another display medium. However, in order to write an image into a displaying medium, there is presently required troublesomely a plurality of step-by-step operations, including (1) mounting a display medium on a write apparatus, (2) selecting an image to be written and (3) instructing to write the selected image into the display medium. Thus, image rewrite is not preferred in view of user's operation efficiency.

SUMMARY

According to one aspect of the present invention, there is provided an image writing system comprising:

a display medium that display an image rewritably recorded according to an external force for writing and holds the image after the external force is removed, the display medium including a memory that stores capability information on a capability of displaying an image on the display medium, the capability information being externally read out; and a writing apparatus that apply the external force to the display medium so as to write the image into the display medium, the writing apparatus including:
  a reading section that reads the capability information from the memory;
  a display-capability presenting section that presents information including the capability information, a list of images to be written, and display attributes of the respective images;
  an image-selection accepting section that accepts a selection of an image to be written into the display medium; and
  a writing section that apply the external force to the display medium so as to write the selected image into the display medium.

BRIEF DESCRIPTION OF THE DRAWINGS

Embodiments of the present invention will be described in detail based on the following figures, wherein.

DETAILED DESCRIPTION

The present invention will be explained in detail based on an exemplary embodiment thereof.

In an exemplary embodiment of the present invention, an electronic paper is used as a display medium capable of forming thereon an image rewritable in accordance with external force for writing and holding the recorded image even after removing the external force. The principle of displaying an electronic paper is based on driving a device including the electronic paper by directly applying external energy, e.g. electricity, magnetism or heat, on driving the device by means of a voltage change with light illumination, or on driving the device in a chain-reacting fashion, for example, by causing a color-state change due to a liquid PH change with voltage application.

The electronic paper includes, for example, a transfer writing type and a self-rewriting type, according to a recording scheme to hold an image on display. In any type, the display medium is of a thin type like a paper, as called an electronic paper.

The transfer-writing electronic paper is first explained in detail.

The transfer-writing type electronic paper that includes, as an example, an optical writing electronic paper is, for example, of a flexible thin type having such a size as a card defined under JIS or ANSI standard or as an A4-size paper. It has a display, occupying the greater part of area, having one side where is provided a writing electrode to which voltage can be applied to drive the display. Incidentally, the display is given in a size in accordance with the use purpose thereof.

With the optical writing electronic paper, the image can be transferred to and stored on the display by putting the display over a liquid-crystal panel displaying the image to be written and then illuminating light to the same while applying a voltage from an external power source to the electrode. In brief, the optical writing electronic paper has a function to transfer a projected image to the display by applying a voltage to the electrode thereof and to hold the relevant image in a display state even after removing the application voltage from the electrode. Incidentally, where using such an optical writing electronic paper, a writing apparatus, referred later, has means required for optical writing, e.g. a voltage applicator to the electrode, a liquid crystal panel and a light illuminator.

The display of the optical writing electronic paper is structured by sandwiching a combination of a layer of an organic photoconductive material (organic photoconductive layer) for use on a copier and a layer of a liquid crystal material (micro-capsulated cholesteric liquid crystal layer) between a pair of transparent electrodes and sandwiching the layered product between a pair of transparent substrate films. With this structure, monochromatic display is available with display-in-white to reflect light at the cholesteric liquid crystal layer and display-in-black to transmit light through the liquid-crystal layer but absorb the light in a black layer provided between the cholesteric liquid-crystal layer and the organic photoconductive layer. Furthermore, the cholesteric liquid crystal has a property to interfere with and reflect a color portion of light in accordance with its helical pitch. By providing a cholesteric liquid crystal in a layered structure having different helical pitches, color display is realized on a simple structure.

With the optical writing electronic paper, in case a voltage is applied to the electrode while displaying an image to be transferred, for example, to an image-writing light-control device panel (light-emitting panel) and projecting it on the display, light intensity is instantaneously converted into a reflection density to hold the projection image. By applying an erasure voltage to the electrode, the image information displayed on the display can be erased away. The optical writing electronic paper can be used repeatedly by the repetition of writing and erasing. Incidentally, by projecting a new image through voltage application to the electrode as in the above without performing such an erasure from the electronic paper, the image information held on the display can be overwritten. Repeated use is available with such overwriting.

Meanwhile, as another example of the transfer-writing electronic paper, there is a structure, the display is made for thermal transfer as is known, that a writing apparatus having a thermal transfer section is arranged to thermally transfer an image to the display so that the image can be held on display.

Next, the self-writing electronic paper is explained in detail.

The self-writing electronic paper is, for example, of a flexible thin type having such a size as a card defined under JIS or ANSI standard or as an A4-size paper. It has a display, occupying the greater part of area, having one side where is provided a processing section to process electronic data. Incidentally, the display is given in a size in accordance with the use purpose thereof. Meanwhile, the processing section is provided with a driver to drive the display as referred later, a communicating section to have communications with the external such as a writing apparatus, a memory to readably, writably hold electronic data, a processor to process electronic data, and a battery to supply an operating power to functional means such as the processor.

The self-writing electronic paper like this is allowed to send and receive display-image electronic data and hold it on the memory, by having communications, at its communicating section, with an external communication device (writing apparatus or the like). Under control of the processor, the self-writing electronic paper drives the driver to rewritably display the image, that is to be held displayed on the display, based on the electronic data held on the memory. It has a function to continuously hold the image in a display state on the display even in case removing the drive power from the driver. Incidentally, the processing section may be provided in the writing apparatus. Due to this, the self-writing electronic paper is eliminated the necessity in the processing section, which makes it possible to manufacture a self-writing electronic paper at low cost.

The display of the self-writing electronic paper is, for example, in a structure that fine colored charge particles (white and black particles) are filled between a pair of electrodes, at least electrode at the main surface side being transparent, which filled structure is sandwiched between a pair of transparent films. An air layer is provided between the electrodes so that colored particles can move without restriction. Meanwhile, an insulation layer is provided to prevent a matrix-formed electrode layer from going into contact with colored particles. Incidentally, by using a color filter, color display is available in a simple structure.

In the state no voltage is applied to the electrode of the self-writing electronic paper (the electrode is, however, charged in the polarity of upon driving in the last time), white particles charged negative (minus) build up on the back-surface side whereas black particles charged positive (plus) build up on the main-surface side. The display region, if viewed at the main surface side, is observed in a black state. When the electrode polarity is inverted at a matrix required points in accordance with the image to display by operating the driver based on electronic data, the white and black particles are replaced in their positional relationship, to display on the display region an image with a contrast based on the white and black particles. Incidentally, by operating the driver based on different ones of electronic data, the image information can be changed that is displayed on the display region based on a contrast of the white and black particles, thus enabling repeated use.

Figure 1:
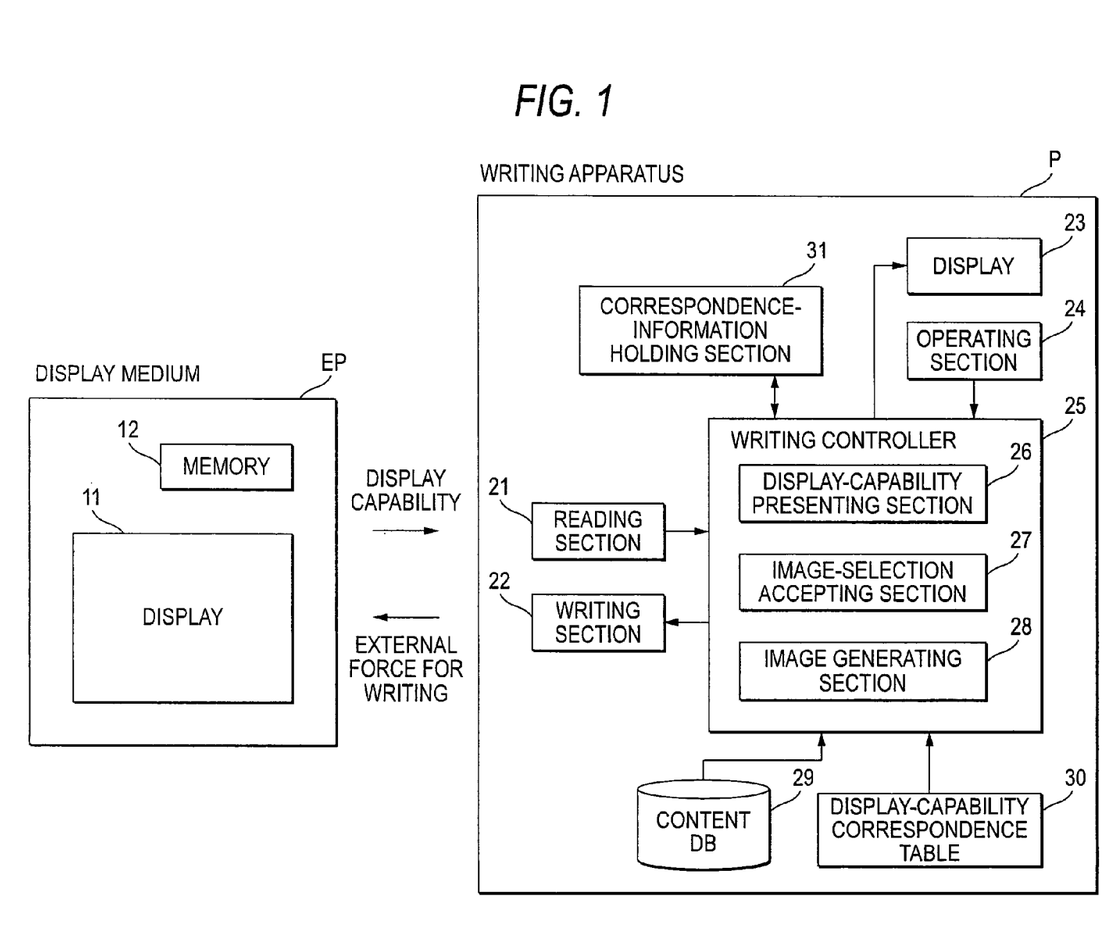
FIG. 1 is a diagram showing an image writing system according to an exemplary embodiment of the present invention.

An image writing system of an exemplary embodiment, using an electronic paper as a display medium, includes an electronic paper EP (display medium) and a writing apparatus P that writes an image into the electronic paper EP by applying an external force.

The electronic paper EP in the embodiment has, in addition to a display 11, a memory 12 stored externally readably with capability information on a capability of displaying an image on the display 11. The embodiment uses an RFID (Radio Frequency Identification) storing information wirelessly readably, as the memory 12.

The writing apparatus P has a reading section 21 that wirelessly reads the capability information sent from the RDID based on the operation power wirelessly supplied to the RFID (memory 12) of the electronic paper EP, a writing section 22 that has a function in accordance with the image recording scheme (optical writing type or self-writing type) of the electronic paper EP and writes an image into the display 11, a display 23 such as a liquid-crystal panel provided to present various pieces of information to a user, an operating section 24 such as a touch panel provided to receive the operation input from the user, a writing controller 25 that controls the image writing into the electronic paper EP, a content DB 29 that holds various pieces of content information of a text, a photograph, etc. to be written, a display-capability correspondence table 30 that records a corresponding relationship between a display capability ID identifying the display capability and the actual data of the display capability, and a correspondence information holding section 31 that stores correspondence information that associates an electronic paper EP and a content selected for writing into the electronic paper EP.

The writing section 25 has a display-capability presenting section 26 that displays, via the display 23, list information about a plurality of electronic papers EP from which capability information has been read, list information about the capability information of electronic papers EP and contents (images) to be written, and display attributes of the contents, an image-selection accepting section 27 that accepts from the user a selection of a content to be written into the electronic paper EP whose capability information has been read, and an image generating section 28 that generates an image of a content selected to be written into an electronic paper EP.

Figure 2:
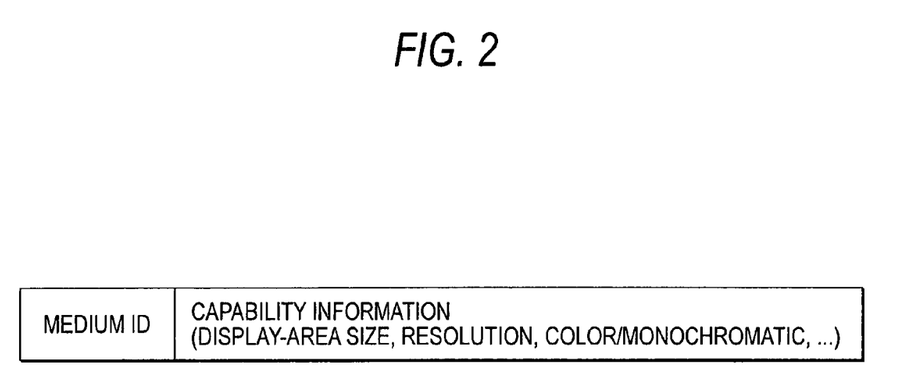
FIG. 2 is a figure explaining storage information on a display medium according to an exemplary embodiment of the present invention.

The capability information is indicative of a capability of displaying an image by means of an electronic paper EP, e.g. display-area size, resolution, color/monochromatic, etc. of the electronic paper EP. It is recorded and held, together with the medium ID identifying an electronic-paper EP, on the RFID (memory 12) of the electronic paper EP.

In the image writing system of the embodiment, the RFID records, as capability information, a display capability ID having display-capability identifying code values, e.g. code value 1 for A3 size and code value 2 for A4 size. Namely, the writing apparatus P in the embodiment can acquire the actual data (i.e., display-area size, resolution, color/monochromatic, etc.) of capability information about an electronic paper EP by looking up the display-capability correspondence table 30, as to the display capability read from the RFID of the electronic paper EP. By thus recording the display capability ID on the RFID, the RFID is reduced of information amount as compared to the case of recording actual data in the RFID. Incidentally, the actual data itself can be recorded in the electronic paper EP at its memory.

Figure 3:
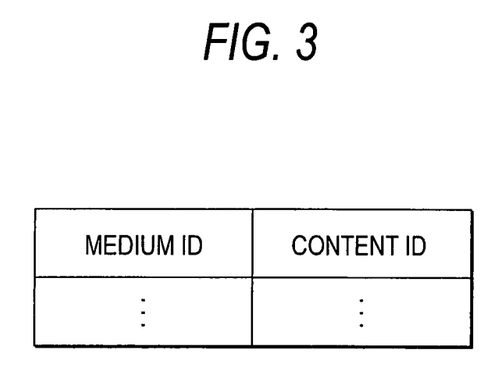
FIG. 3 is a figure explaining information held in a correspondence-information holding section according to an exemplary embodiment of the present invention.

The capability information, read out of the electronic paper EP, is displayed, together with the display attributes (e.g. output size, presence/absence of image data such as of photograph, presence/absence of color portions, etc.) of each of the contents to be written. It can be used for the user to select a content to be written into the electronic paper EP. When the user selects a content to be written into the electronic paper EP, produced is correspondence information that associates the medium ID of an electronic paper EP and the content ID of the selected content, which is recorded in the correspondence-information hold section 31. The correspondence information thus produced is used in actually writing a content image into the electronic paper EP.

Incidentally, the embodiment causes a computer having hardware resources, such as an HDD (hard disk drive), a RAM (random access memory) and a CPU (central processing unit), to execute the program (process for image writing), i.e. to expand the program stored and held on the HDD over the RAM so that the CPU can operate it, thus causing the computer to function as functional means to constitute the writing apparatus P. Alternatively, the functional means may be configured on exclusive hardware.

Meanwhile, although the embodiment configured the writing apparatus P as one apparatus, the writing apparatus P may be configured by functional means separated over a plurality of devices that are communicable one with another.

Figure 4:
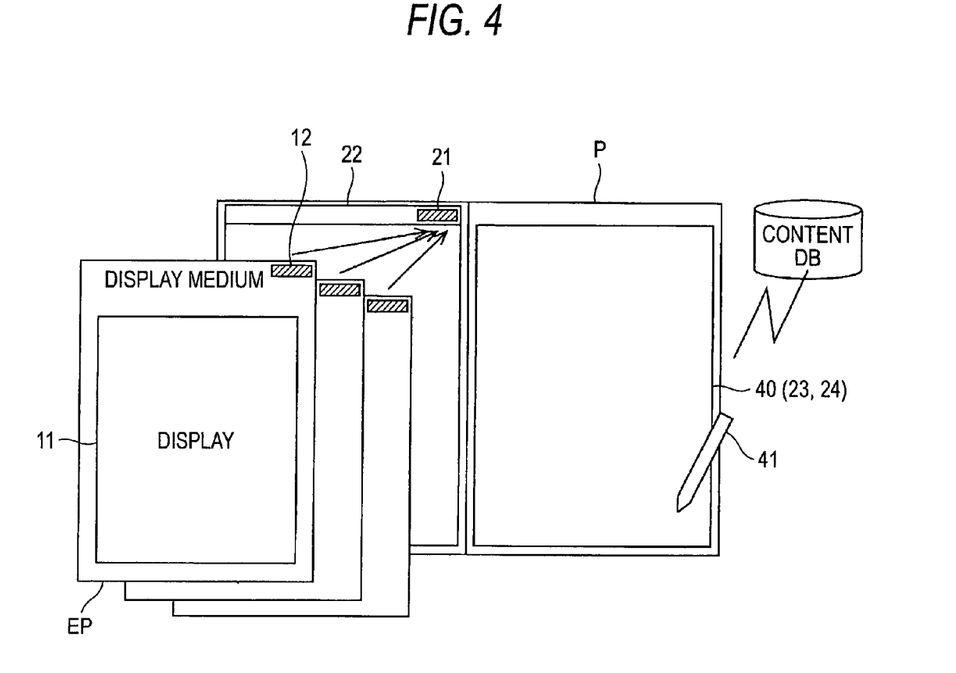
FIG. 4 is a view showing an exterior appearance of a writing apparatus according to an exemplary embodiment of the present invention.

FIG. 4 shows an exterior appearance of the electronic paper EP and writing apparatus P, according to an exemplary embodiment of the present invention.

The electronic paper EP in the embodiment has, at one side (upper in the figure) of a display 11, a medium-end connector to be connected to a writing apparatus P when writing an image, and an RFID (memory 12) in a position close to the medium-end connector.

The writing apparatus P in the embodiment has the writing section 22 in the left side of the apparatus. The writing section 22 has an apparatus-end connector corresponding to the medium-end connector. Namely, by attaching (mounting) the electronic paper EP on the writing apparatus P through connecting the medium-end connector with the apparatus-end connector, image writing is made to the electronic paper EP. Meanwhile, the reading section 21 is provided in a position corresponding to the RFID provided close to the medium-end connector of the electronic paper EP, not only to read information from the RFID of the electronic paper EP put over the reading section 21 but also to read information also from the RFID of the electronic paper EP attached in order to writing an image.

Meanwhile, the writing apparatus P in the embodiment is provided, in the right side of the apparatus, with a touch panel 40 to display various pieces of information and to accept an operation input through an exclusive pen 41 from the user. By the touch panel 40, the display 23 and the operation section 24 are constituted.

Now explanation is made on the operation on the image writing system of an exemplary embodiment of the present invention.

The user first puts the RFID (memory 12) of the electronic paper EP, into which an image is written, in a position corresponding to the reading section 21 of the writing apparatus P, thus allowing the reading section 21 to wirelessly read the medium ID and display capability ID recorded on the PFID.

When the writing apparatus P reads the medium ID and display capability ID from each of electronic papers EP, its display-capability presenting section 26 displays list information of a plurality of electronic papers EP from which capability information has been read and capability information of electronic papers EP, together with list information of contents (images) to be written of from the content DB 29 and display attributes of the contents.

Figure 5:
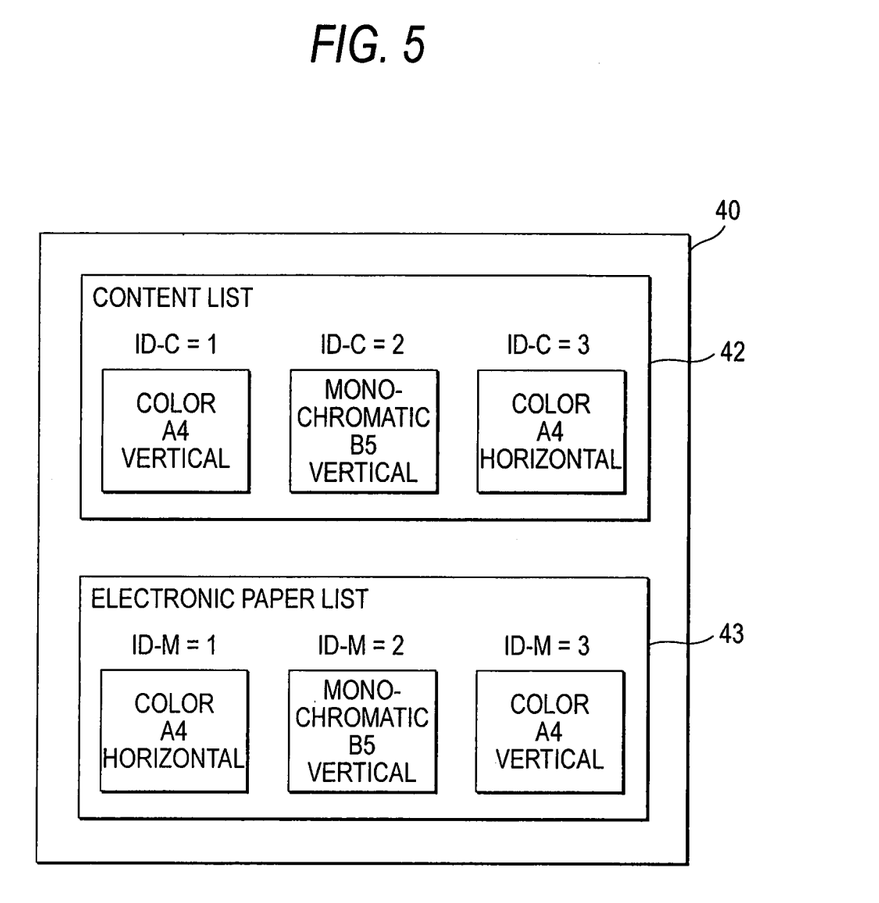
FIG. 5 is a figure showing an example of a display screen according to a writing apparatus according to an exemplary embodiment of the present invention.

In the embodiment, a content list 42 is displayed as a list of contents and content information images indicative of the display attributes thereof in an upper screen area of the touch panel 40 while an electronic paper list 43 is displayed as a list of medium information images indicative of the electronic papers EP and the capability information thereof in a lower screen area of the touch panel 40, as shown in FIG. 5. According to the same figure, the content having a content ID (ID-C) "1" is, for example, set up as a display attribute that it has a color portion and is in an A4 size to be outputted vertically. For example, it can be seen that the electronic paper having a medium ID (ID-M)="1" is an A4-size electronic paper to be displayed in color and having a display capability to display it horizontally. Incidentally, without limited to such display as in the figure, a content information image may be displayed, for example, in a format in accordance with the display attribute thereof so that the user can grasp intuitively the display attribute of the content. Meanwhile, a medium information image may be displayed in a format in accordance with capability information so that the user can grasp intuitively the display capability of the electronic paper.

In case the user drags a content information image and drops it on a medium information image, an operation input is accepted by the image-select accepting section 27, to produce correspondence information that associates the medium ID of an electronic paper EP corresponding to the relevant medium information image with the content ID of a content corresponding to the relevant content information image, which information is recorded in the correspondence-information holding section 31.

After associating the electronic papers with contents, the user mounted the electronic papers EP one by one on the writing apparatus P. In response to the mounting of the electronic paper EP, the writing apparatus P reads a medium ID from the RFID of the electronic paper EP and specifies the content corresponding to the medium ID by looking up the correspondence information recorded in the correspondence-information holding section 31. The image generating section 28 produces a writing image as to the specified content and supplies it to the writing section 22, to write it into the electronic paper EP. Namely, irrespectively of the order of mounting of the electronic papers EP, a content image is written that has been selected as to the electronic paper EP. Incidentally, where setting is not made as to the content to be written to the mounted electronic paper EP, the display capability ID thereof is read and displayed. After accepting the selection of the content to be written into the relevant electronic paper EP, the image is written as to the selected content.

Incidentally, the content image may be written to the electronic paper EP by processing it to the format suited for the capability information of the electronic paper EP. Namely, in the case a content having an A5 size is selected as to an A4-size electronic paper EP for example, the A5-size content image is processed for enlargement to an A4-size one and written into the electronic paper EP. When a content having an A3 size is selected as to an A4-size electronic paper EP, for example, a processing for enlargement is made to write it into the electronic paper EP. Incidentally, a format (e.g. image reduction or enlargement ratio, image monochromatizing or assignment of a plurality of images to one electronic paper EP) may be accepted from the user upon selecting a content to be written, wherein the accepted format of information is satisfactorily included in the correspondence information.

The embodiment used the RFID as a memory 12 of the electronic paper EP. Alternatively, barcode information indicative of capability information, for example, may be added to the electronic paper EP while the writing apparatus P may have a barcode reading section to read a barcode image, so that capability information can be acquired based on the barcode image read out by the barcode read section.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:
1. An image writing system comprising:
a display medium that: i) displays an image on a display screen, the image being rewritably recorded according to an external force for writing, and ii) holds the image after the external force is removed, the display medium including a memory that stores capability information on a capability of displaying the image on the display screen of the display medium, the capability information being externally read out; and
a writing apparatus that applies the external force to the display medium so as to write the image into the display medium, the writing apparatus including:
a reading section that reads the capability information from the memory;
a display-capability presenting section that presents information including the capability information, a list of images to be written, and display attributes of the respective images;
an image-selection accepting section that accepts a selection of an image to be written into the display medium; and
a writing section that applies the external force to the display medium so as to write the selected image into the display medium, wherein
the capability information contains identification information for identifying the capability of the display medium to display the image,
the writing apparatus has a display-capability correspondence table associating the identification information with actual data on the capability of the display medium to display the image, and
the display-capability presenting section presents information including the actual data corresponding to the identification information.
2. The image writing system according to claim 1, wherein
the reading section reads the capability information with respect to each of a plurality of display mediums,
the display-capability presenting section presents information including a list of the plurality of display mediums, capability information of the respective display mediums, a list of images to be written, and display attributes of the respective images,
the image-selection accepting section accepts, with respect to each of the display mediums, a selection of an image to be written into the each of the display mediums, the writing apparatus further includes a correspondence information holding section that stores correspondence information associating the selected image with a display medium on which the selected image is written, and when a display medium is mounted in the writing apparatus, the writing section specifies an image corresponding to the display medium and writes the image into the display medium.

3. The image writing system according to claim 1, wherein the writing section writes an image into the display medium, the image being converted into a format suited for the capability information of the display medium.

4. The image writing system according to claim 1, wherein the writing apparatus further includes a display that displays the information presented by the display-capability presenting section.

5. The image writing system according to claim 1, wherein the display medium defines a plane, and on at least one side of the plane a plurality of pixels occupy a majority of the at least one side of the plane.

6. A writing apparatus comprising:
a reading section that reads, from a display medium that displays an image on a display screen, capability information regarding a capability of displaying the image on the display medium, the image being: i) rewritably recorded according to an external force for writing, and ii) held on the display screen of the display medium after the external force is removed, the capability information containing identification information for identifying the capability of the display medium to display the image;
a display-capability correspondence table associating the identification information with actual data on the capability of the display medium to display the image;
a display-capability presenting section that presents information including the actual data corresponding to the identification information, a list of images to be written, and display attributes of the respective images;
a display that displays the information presented by the display-capability presenting section;
an image-selection accepting section that accepts a selection of an image to be written into the display medium; and
a writing section that applies the external force to the display medium so as to write the selected image into the display medium.

7. The writing apparatus according to claim 6, wherein the display medium defines a plane, and on at least one side of the plane a plurality of pixels occupy a majority of the at least one side of the plane.

8. A display medium comprising:
a display screen that displays an image, the image being rewritably recorded according to an external force, the image being held on the display screen after the external force is removed; and
a memory that stores capability information on a display capability of displaying the image on the display screen, the capability information containing identification information for identifying the capability of the display medium to display the image; and
a writing apparatus including a display-capability correspondence table associating the identification information with actual data on the capability of the display medium to display the image, and being capable of reading the capability information from the memory and displaying the actual data corresponding to the identification information together with a list of images to be written and display attributes of the respective images so that an image to be written into the display screen can be selected.

9. The display medium according to claim 8, wherein the display screen defines a plane, and on at least one side of the plane a plurality of pixels occupy a majority of the at least one side of the plane.

10. A method for writing an image on a display medium, the display medium having capability information containing identification information for identifying a capability of the display medium to display the image on a display screen of the display medium, the image being rewritably recorded according to an external force for writing and being held on the display screen of the display medium after the external force is removed, the method comprising:
reading the capability information;
providing the identification information contained in the capability information to a display-capability correspondence table associating the identification information with actual data on the capability of the display medium to display the image;
presenting information including the actual data corresponding to the identification information, a list of images to be written, and display attributes of the respective images;
displaying the presented information;
accepting a selection of an image to be written into the display medium; and
applying the external force to the display medium so as to write the selected image into the display medium.

11. The method according to claim 10, further comprising:
displaying the selected image on the display medium, wherein the display medium defines a plane, and on at least one side of the plane a plurality of pixels occupy a majority of the at least one side of the plane.

12. A non-transitory computer readable medium storing a program causing a computer to execute a process for writing an image on a display medium, the display medium having capability information containing identification information for identifying a capability of the display medium to display the image on a display screen of the display medium, the image being rewritably recorded according to an external force or writing and being held on the display screen of the display medium after the external force is removed, the process comprising:
reading the capability information;
providing the identification information contained in the capability information to a display-capability correspondence table associating the identification information with actual data on the capability of the display medium to display the image on the display screen;
presenting information including the actual data corresponding to the identification information, a list of images to be written, and display attributes of the respective images;
displaying the presented information;
accepting a selection of an image to be written into the display medium; and
applying the external force to the display medium so as to write the selected image into the display medium.

13. The non-transitory computer readable medium according to claim 12, wherein the display medium defines a plane, and on at least one side of the plane a plurality of pixels occupy a majority of the at least one side of the plane.

* * * * *